United States Patent [19]

Nogami et al.

[11] Patent Number: 4,463,162

[45] Date of Patent: Jul. 31, 1984

[54] POLYNUCLEAR FUSED AROMATIC RING TYPE POLYMER AND PREPARATION THEREOF

[75] Inventors: Sumitaka Nogami, Yokohama; Tsuneo Wakabayashi, Ise; Eiichi Oono; Yoshiharu Kitahama, both of Kawasaki; Isamu Iwami, Zushi, all of Japan

[73] Assignee: Asahi-Dow Limited, Tokyo, Japan

[21] Appl. No.: 327,724

[22] Filed: Dec. 4, 1981

[30] Foreign Application Priority Data

Dec. 9, 1980 [JP] Japan ................................ 55-172545
Dec. 9, 1980 [JP] Japan ................................ 55-172546
Dec. 12, 1980 [JP] Japan ............................... 55-174717

[51] Int. Cl.$^3$ .............................................. C08G 63/18
[52] U.S. Cl. ..................................... 528/190; 528/125; 528/126; 528/128; 528/179; 528/183; 528/220; 528/222; 528/223; 528/298
[58] Field of Search ............... 528/190, 220, 298, 125, 528/126, 128, 222–223, 179, 183

[56] References Cited

U.S. PATENT DOCUMENTS 3,143,526 8/1964 Caldwell et al. ................... 528/190
3,856,526 12/1974 Hamb et al. ........................ 528/190

FOREIGN PATENT DOCUMENTS 2726116 6/1977 Fed. Rep. of Germany .
43-24755 10/1968 Japan .
52-145036 2/1977 Japan .

*Primary Examiner*—Lester L. Lee
*Attorney, Agent, or Firm*—Armstrong, Nikaido, Marmelstein & Kubovcik

[57] ABSTRACT

A condensation polymer having a $\eta sp/C = 0.1 - 1.5$, containing an anthracene unit in the main chain of the polymer, which is found to have various functions of ultraviolet absorption, fluorescence emission, photoconductivity, organic semiconductor characteristics, etc. as well as excellent flexibility and mechanical strength, is prepared by condensation of an anthracenediol compound with a dicarboxylic acid dihalide or a hydrocarbylene dihalide.

41 Claims, No Drawings

POLYNUCLEAR FUSED AROMATIC RING TYPE POLYMER AND PREPARATION THEREOF

This invention relates to a macromolecular compound containing a polynuclear aromatic ring in the main chain.

A number of macromolecular compounds containing an aromatic ring such as benzene structure in the main chain have been synthesized in the prior art for their high heat resistance as well as high strength. Among them, some resins such as polyarylate resin, polyphenylene oxide resin have already been made practically available. However, there has been obtained no practically useful polymer with a high degree of polymerization containing a polynuclear aromatic group as an aromatic group in the main chain, although various functions including ultraviolet absorption, fluorescence emission, photoconductivity, organic semiconductor characteristics, etc., can be expected in addition to high heat resistance and high strength for such a polymer.

For example, Japanese Patent Publication No. 24755/1968 discloses a compound speculated to have a poorly regular and symmetrical structure as shown below from a starting material such as anthracene by the reaction of formaldehyde or paraformaldehyde and hydrogen chloride gas or hydrochloric acid:

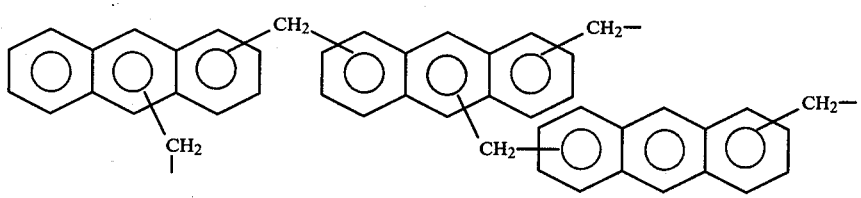

But, as apparently seen from the above structure, this compound is crosslinked. Therefore, a product with a higher molecular weight is insoluble and infusible, and there is no way for processing thereof. Thus, only a product with a lower molecular weight is practically useful. In fact, the above compound as disclosed in Example of said Japanese Patent Publication No. 24755/1968 has a molecular weight of 1500-1750, namely an extremely low degree of polymerization of 8 to 10. Such a low molecular weight polymer is far from practically useful, since it has no satisfactory film forming property, to say nothing of mechanical strength. Japanese Laid-open Patent Application No. 145036/1977 refers to, in addition to the above compound, other various polymers using anthracene as the starting material, such as a condensation polymer with xylylene diacetate through elimination of acetic acid, a condensation polymer with a xylylene dihalide through elimination of a hydrogen halide, a condensation polymer with xylyleneglycol dimethylether through elimination of methanol and a condensation polymer of a halomethylated anthracene through self-elimination of a hydrogen halide. In any of these polymers, however, anthracene structures are incorporated in the main chain in an indefinite fashion similarly as in the aforesaid Japanese Patent Publication No. 24755/1968, thus giving only a structure lacking in regularity and symmetry. They are also essentially crosslinked reaction products, similarly as in case of Japanese Patent Publication No. 24755/1968, and therefore the products with higher molecular weights are insoluble and infusible crosslinked polymers infeasible of processing, while those with lower molecular weights suffer from the practically vital defect of exhibiting even no film forming property due to deficiency in regularity and symmetry. In fact, in the invention according to the above Japanese Laid-open Patent Application No. 145036/1977, film forming property is imparted with difficulty to a brittle low molecular weight polymer having a degree of polymerization of 10 or less by use in combination of a large amount of a plasticizer as a second essential component. Only in German OLS No. 2726116, there is a description that a polynuclear aromatic compound is condensed with formaldehyde to obtain a polymer. As is well known in the art, the product to be obtained in such a reaction is a polymer of at most several monomers, namely a low molecular weight compound exhibiting even no film forming property, to say nothing about mechanical characteristics. In fact, in said Patent, a film-like molded product is obtained with difficulty by use of a large amount of a binder.

The present inventors have made extensive studies to obtain a polymer containing a polynuclear aromatic group in the main chain. Consequently, it has now been found that there can be obtained a polymer excellent in film forming property and flexibility by incorporation of a dioxyl group of a polynuclear fused aromatic ring.

The present invention provides a condensation polymer having a reduced specific viscosity of 0.1–1.5 at 30° C. of a 1% by weight solution in tetrachloroethane, comprising recurring units of the formula (I) or (II):

wherein X represents an aryldioxyl group of the formula: —O—Ar—O— (wherein Ar is an anthracene unit) and Y represents (a) $C_{6-16}$ dicarboxylic acid residues or (b) $C_{4-8}$ hydrocarbylene groups.

wherein X and Y represent the same as defined above and X' is a $C_{6-13}$ hydrocarbylenedioxyl group, Y' is selected from the groups consisting of (a) and (b) as defined in the formula (I) but Y is different from Y', the content of Ar being about 10 to about 80% by weight based on the total weight of the condensation polymer, and also processes for producing the same.

The specific feature of the polymer according to the present invention resides in incorporation of an aryldioxyl group, of which aryl moiety is an unsubstituted or substituted anthracene dioxy unit, represented by the formula:

Typical examples of Ar may include 9,10-anthracenylene and substituted 9,10-anthracenylenes.

As substituents on 9,10-anthracenylene ring, there may be mentioned halogen atoms such as chlorine or bromine, methyl or ethyl, methoxy or ethoxy; di-$C_{1-2}$ alkylamino groups such as N,N-dimethylamino, N,N-diethylamino. The number of substituents may be 1 or 2. When two of substituents are employed, they may be the same or different.

Exemplary substituted 9,10-anthracenylene groups include 2-chloro-9,10-anthracenylene, 2-methyl-9,10-anthracenylene, 2-methoxy-9,10-anthracenylene, 2-chloro-6-methyl-9,10-anthracenylene, 2,7-dichloro-9,10-anthracenylene, 2,6-dimethyl-9,10-anthracenylene, 2-methyl-7-chloro-9,10-anthracenylene, 2,6-dimethoxy-9,10-anthracenylene, 2-ethoxy-9,10-anthracenylene, 2-methoxy-9,10-anthracenylene, and 2,6-di(N,N-diethylamino)-9,10-anthracenylene.

In the present invention, X may preferably be constituted substantially of said aryldioxyl group, but it may also be replaced partially with a $C_{6-13}$ hydrocarbylenedioxyl group. The "hydrocarbylenedioxyl group" used in the present invention refers to a dioxyl group of hydrocarbons with 6-13 carbon atoms, typically those represented by the following formula:

$$-O-R^1-O-$$

wherein $R^1$ is a phenylene or a 4,4'-isopropylidenephenylene.

In the recurring units constituting the condensation polymer according to the present invention, another constituent represented by Y include the three classes of groups, namely:
(a) $C_{6-13}$ hydrocarbylene group of the formula:

$$-R^3-$$

wherein $R^3$ is a phenylene or a 4,4'-isopropylidenephenylene.
(b) $C_{6-16}$ dicarboxylic acid residue of the formula:

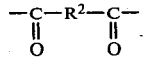

wherein $R^2$ is a $C_{4-14}$ alkylene group or a phenylene group.

As $C_{4-14}$ alkylene groups represented by $R^2$, there may be included ethylene, tetramethylene, pentamethylene, heptamethylene, octamethylene, and decamethylene. Typical examples of the phenylene groups represented by $R^2$ are 1,4-phenylene, 1,3-phenylene and 1,2-phenylene.

In the recurring units of the present invention as described above, the groups represented by X and Y may be included as a single species or two or more species. More specifically, the polymer of the present invention may also contain at least one kind of the units selected from the group consisting of:

$$-[X'-Y']-$$

Then $-X'-Y'-$ constitutes the general formula (II).

Specific examples of condensation polymers of this invention are enumerated below, but the present invention is not limited thereto.

A.
POLYESTERS

1. Poly-9,10-anthracenedioladipate

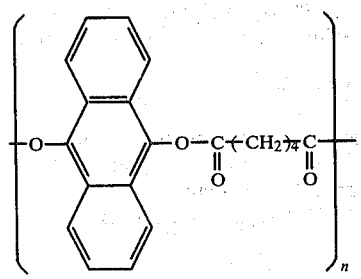

2. Poly-9,10-anthracenediol-1,10-decanedicarboxylate

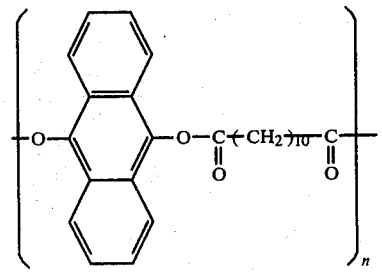

3. Poly-2-chloro-9,10-anthracenediol-1,14-tetradecanedicarboxylate

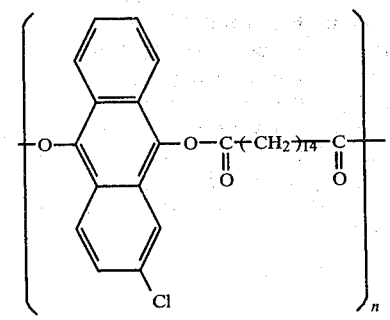

4. Poly-2,6-dimethoxy-9,10-anthracenediol-1,10-decanedicarboxylate

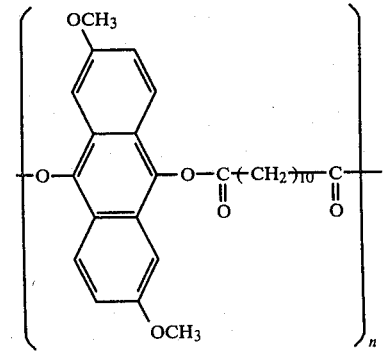

5. Poly-2,6-dimethoxy-9,10-anthracenediolsebacate

6. Poly-2,6-dimethoxy-9,10-anthracenediolazelate

-continued
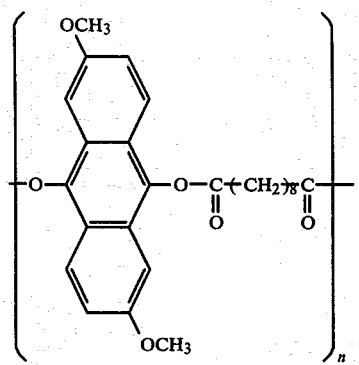
7. Poly-2,6-dimethoxy-9,10-anthracenediolpimellicate
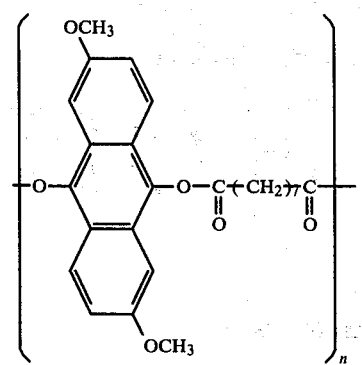
8. Poly-2,6-dimethoxy-9,10-anthracenediol-1,12-dodecanedicarboxylate
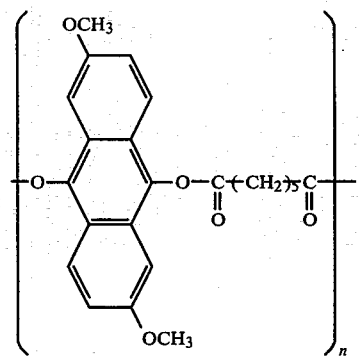
9. Poly-2,6-dimethoxy-9,10-anthracenedioladipate
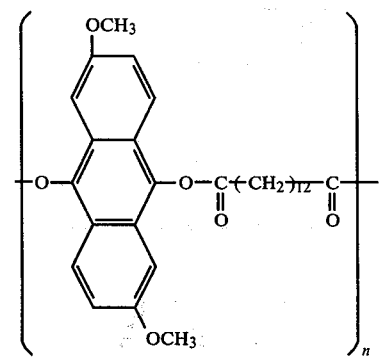
10. Poly-(2,6-dimethyl-9,10-anthracenediol-bisphenol A)-1,12-dodecanedicarboxylate
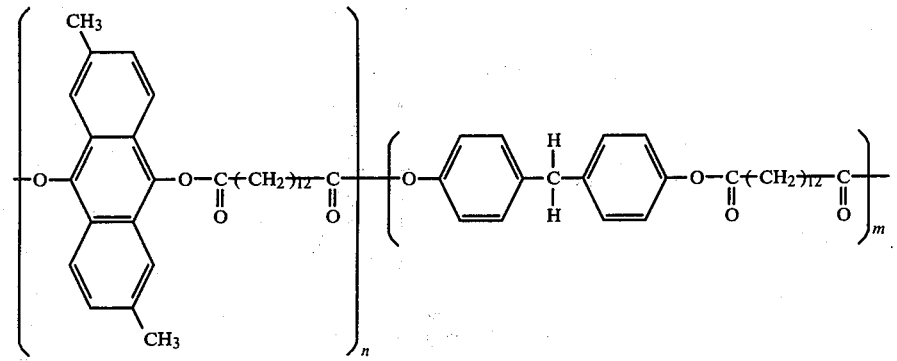
11. Poly-(9,10-anthracenediol-bisphenol A) sebacate copolymer -continued

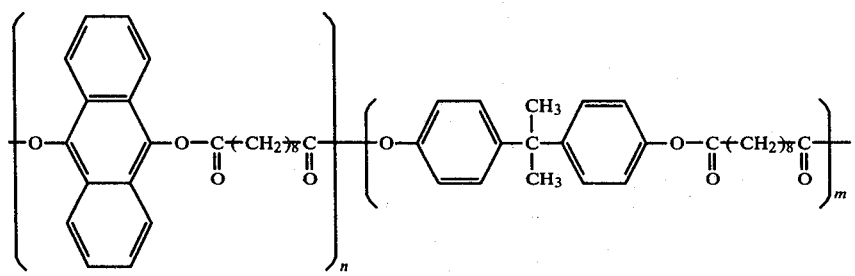

12. Poly-2-methoxy-9,10-anthracenediol sebacate

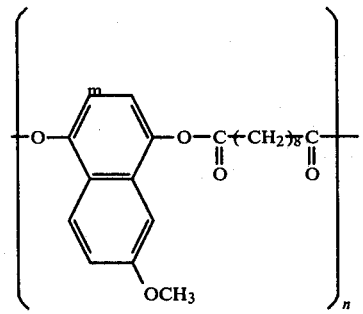

13. Poly-2-methyl-7-chloro-9,10-anthracenediol(adipate-sebacate) copolymer

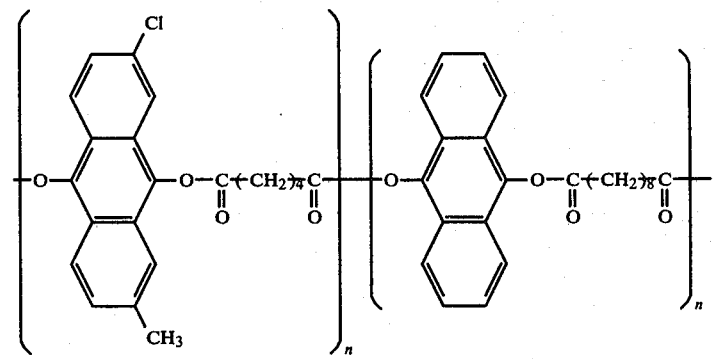

B
POLYETHERS

14. Poly-9,10-anthracenediol-octanediol ether

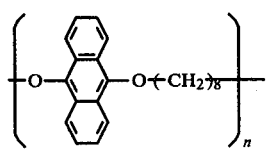

15. Poly-9,10-anthracenediol-pentanediol ether

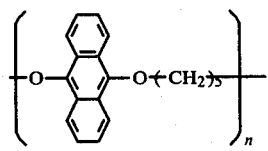

16. Poly-9,10-anthracenediol-hexanediol ether

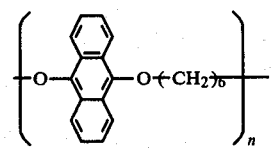

17. Poly-2-chloro-9,10-anthracenediol-octanediol ether

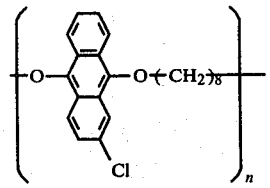

18. Poly-2,6-dimethoxy-9,10-anthracenediol-(butanediol-pentanediol)ether copolymer -continued

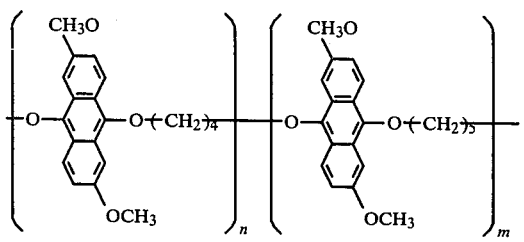

19. Poly-(2,6-dimethoxy-9,10-anthracenediol-hydroquinone)-hexanediol ether copolymer

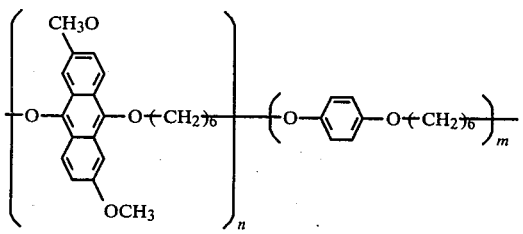

In the condensation polymer according to the present invention, the content of the anthracene unit is about 10 to about 80% by weight based on the total weight of the condensation polymer and can be shown by the following formula:

$$\begin{bmatrix}\text{Content of anthracene} \\ \text{unit (\% by weight)}\end{bmatrix} = \begin{bmatrix}\text{Weight of anthracene} \\ \text{contained in 1 g of a} \\ \text{polymer}\end{bmatrix} \times 100$$

This value can readily be mentioned from absorptions of respective specific peaks of absorption in the UV-absorption spectrum according to anthracene unit, for example, the peaks at: 350 to 420 nm.

A polymer containing less than 10% by weight of the above anthracene unit does not exhibit the characteristic functions of the polymer of this invention such as ultraviolet absorption, fluorescence emission, photoconductivity and organic semiconductor characteristics. On the other hand, a polymer with a content of the skeleton exceeding 80% by weight is poor in processability and brittle, thus failing to be practically useful.

The degree of the present condensation polymer can be obtained on the basis of reduced specific viscosity $\eta sp/C$ at 30° C. of a 1% by weight solution of the polymer in tetrachloromethane. The specific viscosity is within the range from 0.1 to 1.5, preferably within the range from 0.2 to 1.2. The specific reduced viscosity of a polymer is not so large as a film can not easily be produced when the viscosity is less than 0.2, while less solubility in a solvent and fusibility make workability worse when the viscosity is more than 1.2.

The softening temperature or melting point is observed by use of a differential scanning calorimeter (D.S.C.).

As described above, the specific feature of the polymer according to the present invention is derived from the anthracene unit contained in the main chain of the polymer. A polymer of a high molecular weight having excellent film forming property and flexibility can be obtained only when the anthracene unit is contained structurally in the main chain, and it is essentially different from the polymers containing a polynuclear fused aromatic ring of prior art as mentioned above. That is, in the polymer according to the present invention, the anthracene unit is bonded in the main chain of the polymer through an oxygen atom. As is well known in the art, such a mode of bonding has the least steric hindrance and can accomplish a flexible bonding, whereby the resulting polymer exhibits softness or flexibility by far superior to polymers containing polynuclear aromatic ring of prior art. Accordingly, there can be obtained a polymer having practically useful film forming property as well as mechanical strength, while retaining various functions derived from the anthracene unit contained in the polymer, such as ultraviolet absorption, fluorescence emission, photoconductivity, and organic semiconductor characteristics.

The condensation polymer according to this invention can be prepared by the methods as described below.

A

PREPARATION OF A POLYESTER

When the condensation polymer according to the present invention is a polyester, namely when Y in the above formula (I) is a $C_{6-16}$ dicarboxylic acid residue of the formula (a) as described above, it can be prepared by any of the processes (A-I) and (A-II) as described below.

Process (A-I)

This process comprises allowing an anthracenediol of the formula:

HO—Ar—OH wherein Ar is the same as defined above, together with, if desired, a diol compound of the formula:

HO—R¹—OH wherein $R^1$ is the same as defined above, to react with a $C_{6-16}$ dicarboxylic acid dihalide.

Before carrying out the process, for preparation of a starting material, an anthraquinone compound or a halogenated derivative, an alkyl derivative, an alkoxyl derivative or an aryloxyl derivative of the anthraquinone compound is reduced to an anthracenediol. As a reducing agent to be used in this reduction step, there may be mentioned sodium borohydride. A typical process for preparation of the diol comprises dispersing sufficiently the anthraquinone compound or a substituted derivative thereof in an inert solvent such as ethyleneglycol dimethylether, then adding 10 to 500 parts by weight of a reducing agent per 100 parts of the anthraquinone compound or substituted derivative thereof to perform the reaction under stirring for 30 minutes to 6 hours, followed by pouring gradually of the reaction mixture into a large volume of an acidic cold water (e.g. ice-cooled 1N aqueous hydrochloric acid, etc.). After addition of the whole amount, stirring is continued for a while, the diol compound formed is filtered off and washed thoroughly with pure water.

Using the thus prepared diol compound as the starting material, the polymer of this invention can be synthesized.

One example of synthesis of a polyester is to be described below. The diol compound prepared according to the method as described above, alone or a mixture with other diol components such as hydroquinone, or bisphenol A (hereinafter referred to as diol compounds), is dissolved or dispersed in a solvent such as tetrahydrofuran, ethyleneglycol dimethylether, etc. To the resultant solution or dispersion there is added a dicarboxylic acid dihalide such as isophthalic acid, dichloride in an amount of 1 to 10 equivalents based on the total diol components, and the mixture is heated for 6 to 20 hours to provide a desired polyester containing polynuclear aromatic rings. In this reaction, it is preferable to add an alkali such as potassium hydroxide sodium hydroxide metallic sodium, pyridine, etc. as an agent for eliminating hydrogen halide.

Alternatively, a polyester containing anthracene units can also be synthesized by the following method. Namely, the aforesaid starting material of the anthracene diol is dissolved in water containing an alkali hydroxide (e.g. potassium hydroxide, sodium hydroxide, etc.) in an amount of at least equivalent to the diol group. To the resultant solution, there is added a solution containing the aforesaid dicarboxylic acid dihalide dissolved in an organic water-immiscible solvent such as carbon tetrachloride, chloroform, chloroethane, tetrachloroethane, diisopropyl ether, etc. and the mixture is subjected to rapid stirring to prepare a polymer. Since the reaction proceeds in a heterogeneous system, the progress of the reaction can be accelerated by addition of a surfactant such as sodium laurylsulfonate, betainealkyltrimethylammonium chloride, coconut oil alkyltrimethylammonium chloride, etc. In this method, the reaction time can be shorter than in the previous method and the reaction completed generally within 10 minutes to 6 hours, and it is not necessary to apply heating during the reaction, and thus this method is a preferable one.

Process (A-II)

This process comprises allowing an anthraquinone compound of the formula:

wherein Ar' is the anthraquinone residue, to react with a C$_{6-16}$ dicarboxylic acid dihalide, under a reducing atmosphere in the presence of a reducing agent, preferably in an excessive amount.

As an anthraquinone compound, there may be employed, for example, anthraquinone, nucleus-substituted derivatives thereof such as halogenated derivatives, alkyl derivatives, alkoxyl derivatives, etc.

As a C$_{6-16}$ dicarboxylic acid dihalide, there may be employed, for example, a C$_{4-14}$ divalent aliphatic carboxylic acid dihalide such as adipic acid dichloride, adipic acid dibromide, pimellic acid dichloride, succinic acid dichloride, azelaic acid dichloride, sebacic acid dichloride, 1,10-decanedicarboxylic acid dichloride and a divalent aromatic dicarboxylic acid dihalide such as phthalic acid dichloride, isophthalic acid dichloride, terephthalic acid dichloride, etc.

In carrying out the reaction between these starting materials under a reducing atmosphere, the reducing agent to be employed to maintain the reaction system under a reducing atmosphere may include, for example, sodium sulfite, sodium hydrogen sulfite, sodium dithionite, etc. In practicing this method, the aforesaid anthraquinone is dispersed in water, and then the above reducing agent is added to the dispersion in an amount of 1 to 100 equivalents based on the anthraquinone, and further the aforesaid carboxylic acid dihalide is added in an amount of 1 to 10 equivalents based on the quinone compound, and the mixture is subjected to rapid stirring. For the purpose of neutralization of an acid halide formed by the reaction, and also for enhancement of the reducing atmosphere in the system by maintaining a high ph in the system, it is also possible to use an alkali in an amount of 2 to 100 equivalents of the quinone compound. Typical examples of such an alkali are sodium hydroxide, potassium hydroxide, etc. Further, for prevention of decomposition of the carboxylic acid dihalide through contact with water, the carboxylic acid dihalide as mentioned above may be used as a solution in a solvent such as methylene dichloride, chloroform, tetrachloroethane, diisopropyl ether, dibutyl ether, anisole, etc. to obtain a favorable result. Since the reaction conducted according to this method is in most cases in a heterogeneous system, for achievement of a greater rate of reaction, there may be added an appropriate surfactant, for example, ammonium salts such as benzyltrimethyl ammonium halides, coconut oil alkyltrimethylammonium halides and the like; phosphonium salts such as n-heptyltrimethylphosphonium halides, methyltriphenylphosphonium halides and the like; arsonium salts such as triphenylmethylarsonium halides, benzyltriphenylarsonium halides and the like; sulfonium salts such as dimethyl-2-hydroxyphenylsulfonium halides, tribenzylsulfonium hydrogen sulfate; and sulfonates such as sodium laurylbenzenesulfonate and the like, in an amount of 0.1 to 20 parts by weight per 100 parts of the anthraquinone compound, thereby the reaction effect can be enhanced.

In carrying out the above reaction, it is not particularly required to control the reaction temperature. But when the carboxylic acid dihalide employed is markedly reactive and tends to be readily decomposed by water, the reaction is conducted desirably under cooling, while, on the contrary, under heating, when the carboxylic acid dihalide is less reactive. In any case, the reaction temperature should preferably be within the range of from $-10°$ C. to $100°$ C. The reaction time depends on the reactivity of the carboxylic acid dihalide employed, and the optimum reaction time will vary greatly depending on individual combinations, but the optimum time exists generally within the range of from 1 to 10 hours.

After completion of the reaction, the reaction mixture is thrown into methanol, acetone or water, and the resultant precipitates of an aromatic polyester are filtered off, or alternatively the mixture is directly subjected to filtration to separate the aromatic polyester, followed by washing and purification with a suitable solvent.

B.

PREPARATION OF A POLYETHER

When the condensation polymer according to the present invention is a polyether, namely when Y in the above formula (I) is a C$_{4-8}$ hydrocarbylene group (b) as described above, it can be prepared by any of the processes (B-I) and (B-II) as described below.

Process (B-I)

This process comprises allowing a polynuclear aromatic diol compound of the formula:

wherein Ar is the same as defined above, together with, if desired, a diol compound of the formula:

HO—R¹—OH wherein R¹ is the same as defined above, to react with a C$_{4-8}$ hydrocarbylene dihalide.

As the starting material, a diol compound prepared by reduction of an anthraquinone compound or its substituted derivative is used similarly as in preparation of a polyester. These diol compounds are first dissolved or dispersed in an organic solvent, especially an ether type solvent such as diethyl ether, tetrahydrofuran, anisole, etc., and then a dihalide such as pentamethylene dibromide, decamethylene dibromide, etc. is added to the solution or dispersion in an amount of 1 to 20 equivalents relative to the total diol component, followed by heating and stirring for 1 to 30 hours, to provide a desired polyether containing polynuclear fused aromatic rings. In this reaction it is preferred to add an alkali such as metallic sodium, sodium hydroxide, pyridine, etc. in order to neutralize a hydrogen halide by-produced as the progress of the reaction.

Process (B-II)

This process comprises allowing an anthraquinone of the formula:

O=Ar'=O wherein Ar' is the anthraquinone residue, to react with a C$_{4-8}$ hydrocarbylene dihalide, under a reducing atmosphere in the presence of an excessive amount of a reducing agent.

As an alternative method for preparation of an anthracene unit polyether, it is also possible to use a method in which a corresponding anthraquinone is subjected to alkali condensation with a dihalide compound, while carrying out a reducing reaction with the use of an excess of a reducing agent, thereby to provide directly a polyether.

As a dihalide compound to react with such a quinone compound, there may be employed a C$_{4-8}$ dihalogenoalkylene such as dichlorohexane, dichloropentane, dichlorooctane, etc; dichloro-p-xylylene, and the like. Of course, the chlorine atoms in these examples may be replaced by bromine atoms or iodine atoms.

Typical examples of the reducing agent to be used in an excess in this reaction are sodium sulfite, sodium hydrogen sulfite and sodium dithionite. As an alkali to be used for the dehalogenation reaction potassium hydroxide or sodium hydroxide may be used in an amount of 1 to 100 equivalents, preferably 3 to 30 equivalents, relative to the anthraquinone.

The reaction may be conducted by using an anthraquinone compound and a dihalide compound, which are weighed precisely depending on the desired molecular weight of the polyether, together with an excess of a reducing agent, which are added in an alkali, followed by heating and stirring at 100° C. to 200° C. for 1 to 15 hours, thus providing easily a polyether. The excessive amount of the reducing agent herein mentioned refers to at least 1.2 equivalent of the amount necessary for reducing a corresponding anthraquinone compound polynuclear aromatic ring, up to 5 equivalents at the most.

This reaction may be conducted in most cases in water, but an organic solvent capable of dissolving a polyether formed may be co-present if desired, whereby preferable results are frequently observed to be brought about. Examples of such an organic solvent are anisole, tetrahydrofuran, dioxane, diethyleneglycol dimethylether and the like.

The polyether formed as the progress of the reaction is gradually precipitated as solids in the system corresponding to its solubility, or alternatively it is formed in the state dissolved in a solvent. When free dihydroquinone compound no longer exists in the reaction system, the reaction is discontinued and the reaction mixture is added into a large quantity of water to recover a polyether, which is in turn subjected to purification with a suitable solvent.

In carrying out the reaction, it is also possible to use a suitable catalyst for condensation reaction, for example, an inter-phase migration catalyst such as benzylammonium chloride, triethylammonium chloride in an amount of 0, 1 to 10% by weight based on the weight of the anthraquinone.

According to the method for preparation of a polyester or a polyether in an excess of a reducing agent, it is not necessary to synthesize separately an unstable dihydroxyquinone compound during the preparation. This leads to the following advantages:

(1) No complicated apparatus and operation are necessary for removal of oxygen.

(2) The equivalent ratio, which is the essential condition in a condensation reaction, can be correctly coincided.

Thus, according to the present invention, it is possible to obtain a polyester or a polyether with a high molecular weight which has been difficult to obtain from an anthraquinone compound, at high yield, and a great contribution to the development of industrial technology is expected.

The present invention is further illustrated in detail by referring to the following Examples and Comparative Examples, which are not limitative but only illustrative of the present invention.

EXAMPLE 1

A dispersion of 208 g of anthraquinone in 1000 ml of ethyleneglycol dimethylether was mixed with 60 g of sodium borohydride under stirring in an nitrogen atmosphere for one hour to prepare a deep red solution.

The solution was added dropwise to 5000 ml of a cold aqueous 1N hydrochloric acid, and the resulting green precipitates were filtered off, washed with water and dried to give 150 g of anthracene-9,10-diol.

To a solution of 210 g of the above anthracene-9,10-diol dissolved in 1500 ml of tetrahydrofuran, there were added 267 g of 1,10-decamethylene dicarboxylic acid dichloride and 80 g of pyridine, and the mixture was stirred for 12 hours while being maintained at a reflux temperature for 12 hours. As a result, 390 g of a pale yellow polymer was obtained.

This polymer was found to be a polymer having a high molecular with a reduced specific viscosity of 0.64 in tetrachloroethane at 30° C., exhibiting a softening point of 152° C.

This polymer was also found to have absorptions at 1760, 1620, 1360, 1100 and 750 cm$^{-1}$ in the infrared absorption spectrum, absorptions at 350 to 390 nm in the ultraviolet absorption spectrum and to exhibit peaks at 165, 153, 145, 136, 128, 52 and 22 to 25 ppm in the $^{13}$C-NMR spectrum. From these data, this polymer was identified to be the polymer shown below having the 9,10-dioxyanthracene structure in the main chain:

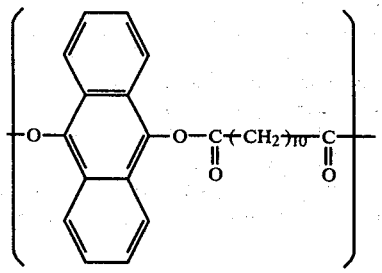

The content of 9,10-anthracenyl groups in the polymer was measured based on the absorption peak at 390 nm in the ultraviolet absorption spectrum to be 50.5% by weight.

EXAMPLE 2

A dispersion of 242 g of 2-chloroanthraquinone in 1000 ml of ethyleneglycol dimethylether was mixed with 65 g of sodium borohydride under stirring in a nitrogen atmosphere for one hour to prepare a dark red solution.

The solution was added dropwise to 6000 ml of a cold aqueous 1N hydrochloric acid, and the resulting green precipitates were filtered off, washed with water and dried to give 187 g of 2-chloro-anthracene-9,10-diol.

Into a solution of 244 g of the above 2-chloro-anthracene-9,10-diol dissolved in 3000 ml of water containing 45 g of sodium hydroxide and 10 ml of a surfactant (Cortamine 24 P, produced by Kao-Atlas Co.), there was added under rapid stirring 1000 ml of 1,1,2,2-tetrachloroethane containing 323 g of 1,14-tetradecamethylene dicarboxylic acid dichloride. As a result, 480 g of a white polymer was obtained.

Analysis of the polymer was performed similarly as in Example 1 to find that it had a $\eta sp/C = 0.6$, including the 9,10-dioxyanthracene structure in the main chain as shown below.

The content of 9,10-anthracenylene groups in this polymer was measured based on the absorption peak at 390 nm in the ultraviolet absorption spectrum to be 48.5% by weight and the softening point was 80° C.

EXAMPLE 3

In 2800 ml of water containing 70 g of sodium hydroxide and 7 ml of a surfactant (Cortamine 24 P, produced by Kao-Atlas Co.), there were dissolved 105 g of anthracene-9,10-diol obtained by the procedure as described in Example 1 and 114 g of bisphenol A. Into the resulting solution was added under rapid stirring 1000 ml of carbon tetrachloride containing 239 g of 1,8-octamethylenedicarboxylic acid dichloride, whereby there was prepared 300 g of a white polymer. The polymer was found to have a $\eta sp/C = 1.2$ and the following structure was determined by the infrared spectrum and the NMR spectrum.

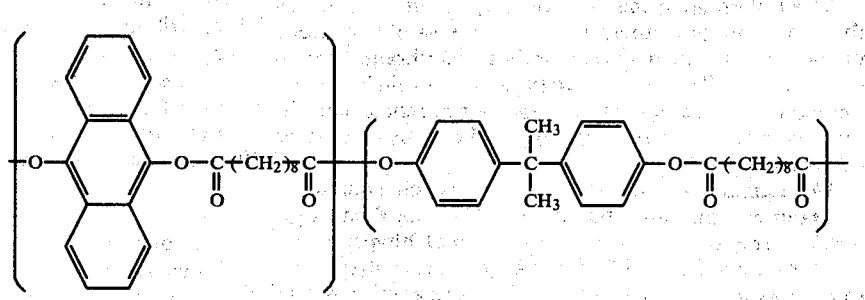

The content of 9,10-anthracenylene groups in this polymer was measured based on the absorption peak at 390 nm in the infrared absorption spectrum to be 27% by weight and the softening point was 170°–190° C.

EXAMPLE 4

A mixture of 2.37 g of 2,6-dimethoxyanthraquinone, 12 g of sodium hydrosulfite ($Na_2S_2O_4$), 15 g of sodium hydroxide, 3.1 ml of coconut oil alkylammonium chloride solution and 300 ml of water was stirred in a mixer for domestic use for 2 hours. The solution was changed in color from yellow to red. Then a solution of 2.71 g of decanedicarboxyl chloride dissolved in 200 ml of tetrachloroethane was added into the above mixer, followed by high speed stirring for 5 minutes. The solution was observed to be changed momentarily in color form red to pale yellow. As the next step, the aqueous layer was separated from the tetrachloroethane layer. After washing sufficiently the tetrachloroethane layer with water, it was added into ethanol to obtain pale crystals. Yield: 64%, (reduced specific viscosity $\eta sp/C = 0.46$ in 1 wt.% tetrachloroethane solution at 30° C.), m.p. 165° C.

This polymer was found to have ultraviolet absorptions at 415, 394, 375, 348, 332, 316 and 295 nm based on the structure of 2,6-dimethoxyanthracene, infrared absorption at 1020 and 1310 cm$^{-1}$ based on C—O—C and C—O, and peaks in the $^1$H-NMR spectrum of 6 hydrogens based on the aromatic structure at 7 ppm, of 6 hydrogen atoms based on CH$_3$O at 3.9 ppm and of 20 hydrogen atoms based on (CH$_2$) at 1 to 3 ppm, indicating that a corresponding polyester was obtained and the 2,6-dimethoxyanthracene content was 51%.

EXAMPLE 5

Example 4 was repeated except that 2.53 g of sebacoyl chloride was used in place of the decanedicarboxyl chloride. Yield: 64%, ($\eta$sp/C=0.32), m.p. 187° C.

UV absorptions similar to those of Example 4 were observed. The $^1$H-NMR spectrum was the same as that of Example 4 except that 16 peaks of hydrogens based on CH$_2$ were observed at 1 to 3 ppm and the 2,6-dimethoxyanthracene content was 54%.

EXAMPLE 6

Example 4 was repeated except that 2.72 g of azealoyl chloride was employed in place of the decanedicarboxyl choride. Yield: 45%, $\eta$sp/C=0.3, m.p. 209° C.

Ultraviolet absorptions were similar to those of Example 4 and the 2,6-dimethoxyanthracene content was 56%.

EXAMPLE 7

Example 4 was repeated except that 1.94 g of adipolyl chloride was used in place of the decanedicarboxyl chloride. Yield: 30%, $\eta$sp/C=0.20, m.p.>300° C. (decompd. at 300° C.). The UV absorption spectrum was similar to that of Example 4 and the 2,6-dimethoxyanthracene content was 62.1%.

EXAMPLE 8

A mixture of 0.26 g (1.1 mmole) of 2,6-dimethylanthraquinone, 11.4 g (0.05 mole) of bisphenol A, 12 g of sodium hydrosulfite, 20 g of sodium hydroxide, 3.1 ml of coconut oil alkylammonium solution and 300 ml of water was stirred in a mixer for domestic use to provide a red solution. Then a solution of 17.41 g (0.05 mole) of dodecanedicarboxyl chloride dissolved in 300 ml of tetrachloroethane was added into the above mixer, followed by high speed stirring for 5 minutes. The solution was observed to be changed momentarily in color from red to pale yellowish white. Subsequently, separation between the tetrachloroethane layer and the aqueous layer was effected and the tetrachloroethane layer was sufficiently washed with water, followed by adding into ethanol to give a pale yellow polymer.

The polymer was found to have a melting point of 300° C., $\eta$sp/C=0.8. The UV absorption spectrum of this polymer was almost the same as that of Example 1 and the 2,6-dimethylanthracene content was 47%.

EXAMPLE 9

In 1000 ml of anisole there was dissolved 210 g of anthracene-9,10-diol prepared according to the procedure as described in Example 1, and then 46 g of metallic sodium was added to the resulting solution. The mixture was heated under stirring for 2 hours, whereby the solution was changed in color to deep red. While stirring the solution at 40° C., 244 g of hexamethylene dibromide was added dropwise thereto over 5 hours and stirring was continued at 100° C. for 7 hours and then at 140° C. for 2 hours. As a result, 270 g of a pale green polymer was obtained. The polymer was found to have $\eta$sp/C=0.8 and a softening point of 130°–135° C.

IR absorption spectrum (cm$^{-1}$): 1620, 1350, 1070, and 770

UV absorption spectrum: 340–410 nm $^{13}$C-NMR spectrum (ppm): 158, 136, 126, 124, 70, 25-21

From these data, the polymer was found to have the following structure having 9,10-dioxyanthracene structure in the main chain:

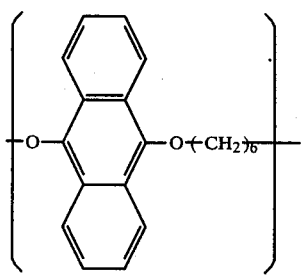

The content of 9,10-anthracenylene group in this polymer was measured based on the absorption peak at 410 nm in the UV absorption spectrum to be 71.0% by weight.

EXAMPLE 10

To 500 ml of water containing 400 g of sodium hydroxide and 20 ml of a surfactant (Cortamine 24 P, produced by Kao-Atlas Co.), there was added 2-chloroanthracene-9,10-diol prepared according to the procedure as described in Example 2. After sufficient stirring of the mixture, 1000 ml of anisole containing 272 g of octamethylene dibromide was added thereto. The mixture was maintained at 150° C. under vigorous agitation for 5 hours to obtain 240 g of a pale green polymer and the softening point was 115°–120° C.

As the result of analysis conducted similarly as in Example 9, this polymer was found to have the following structure:

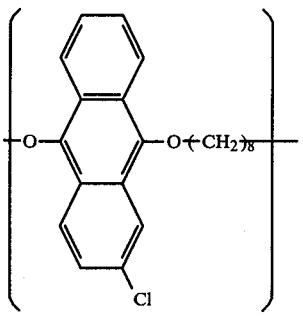

The polymer was also found to have a $\eta$sp/C=1.0. The content of 9,10-anthracenylene group in this polymer was measured based on the absorption peak at 410 nm in the UV absorption spectrum to be 67.8% by weight.

EXAMPLE 11

A dispersion of 268 g of 2,6-dimethoxyanthraquinone in 1800 ml of ethyleneglycol dimethylether was mixed with 75 g of sodium borohydride under stirring under a nitrogen atmosphere for one hour. The solution was then added dropwise to 6000 ml of a cold aqueous 1N hydrochloric acid, and the precipitates formed were filtered off, washed with water and dried to give 220 g of green 2,6-dimethoxyanthracene-9,10-diol.

To 500 ml of water containing 430 g of sodium hydroxide and 20 ml of a surfactant (Cortamine 24 P, produced by Kao-Atlas Co.), there was added 270 g of 2,6-dimethoxyanthracene-9,10-diol. After the mixture was thoroughly stirred, 800 ml of anisole containing 108 g of tetramethylene dibromide and 115 g of pentamethylene dibromide was added thereto. The resulting mixture was maintained at 150° C. for 4 hours under vigorous agitation to obtain 280 g of a pale green polymer.

As the result of analysis conducted similarly as described in Example 9, the polymer was found to have the following structure:

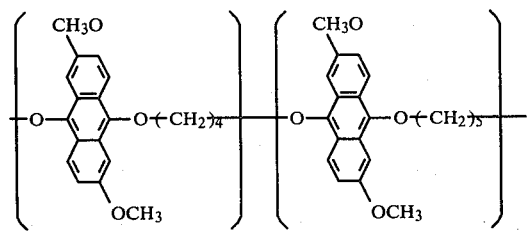

The polymer was also found to have a $\eta sp/C = 1.0$.

The content of 9,10-anthracenylene group in this polymer was measured based on the absorption peak at 410 nm in the UV absorption spectrum to be 78% by weight and the softening point was 140°–150° C.

EXAMPLE 12

To 600 ml of water containing 400 g of sodium hydroxide and 15 ml of a surfactant (Cortamine 24 P, produced by Kao-Atlas Co.), there were added 135 g of 2,6-dimethoxyanthracene-9,10-diol prepared similarly as described in Example 11 and 55 g of hydroquinone. The mixture was stirred well and 800 ml of anisole containing 122 g of hexamethylene dibromide was added to the mixture. The mixture was maintained at 150° C. for 6 hours under vigorous agitation, whereby 215 g of a yellowish green polymer was obtained and the softening point was 125°–130° C.

The polymer was analyzed to have the following structure:

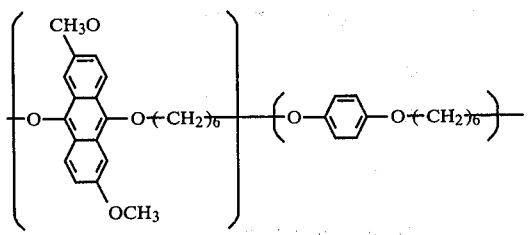

and a $\eta sp/C = 1.1$.

The content of 9,10-anthracenylene group in this polymer based on the absorption peak at 410 nm in the UV absorption spectrum to be 49% by weight.

EXAMPLE 13

A solution of the polymer prepared in Example 1 dissolved in tetrachloroethane was casted on mercury to provide a film with a thickness of 15μ. This film was subjected to flexural test by 180° bending, whereby cracks were formed for the first time after bending had been repeated 20 times.

COMPARATIVE EXAMPLE 1

The reaction between 43 g of anthracene and 19 g of paraformaldehyde was carried out in 540 ml of acetic acid containing 12 g of hydrogen chloride gas at 60° C. for 20 hours. The precipitates formed were filtered off, washed with water and dried. The product was further subjected to purification by re-precipitation from benzene to obtain 35 g of pale yellow powders. The powders were found to be a polymer having an indefinite structure as shown below, as measured by the $^{13}$C-NMR spectrum.

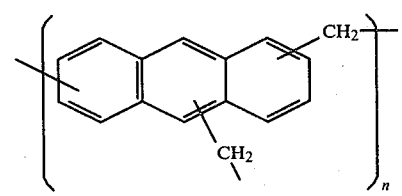

The above powders were dissolved in benzene and film fabrication was effected similarly as in Example 13. As the result of flexural test of the film obtained, cracks were formed at the first bending.

EXAMPLE 14

The film prepared in Example 13 was cut out in the shape of a letter and adhered on a transparent acrylic plate. Then a UV-ray with the wavelength of 365 nm was irradiated on the letter-shaped film, whereby a blue fluorescence with high intensity was emitted therefrom, thus indicating that the polymer can be an excellent display material.

EXAMPLE 15

From a solution of 1 g of the polymer prepared in Example 10 and 0.6 g of tetracyanoquinodimethane dissolved in tetrachloroethane, there was fabricated a film similarly as in Example 13 to obtain a dark brown film. The electrical resistance to direct current of this film was measured to find that the film was an organic semiconductor having a specific volume resistivity of $10^5$ ohm.cm.

We claim:

1. A condensation polymer having a reduced specific viscosity of 0.1–1.5 at 30° C. of a 1% by weight solution in tetrachloroethane, comprising recurring units of the formula (I) or (II):

 (I),

 (II)

wherein X represents an aryldioxyl group of the formula: —O—AR—O— wherein Ar is an anthracene unit, X' represents a $C_{6-13}$ hydrocarbylenedioxyl group, Y and Y' represents (a) a $C_{4-8}$ hydrocarbylene group or (b) a $C_{6-16}$ dicarboxylic acid residue of the formula:

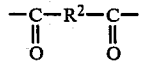

wherein $R^2$ is a $C_{4-14}$ alkylene group or a phenylene group, and Y is different from Y′, the content of Ar being about 10 to about 80% by weight based on the total weight of the condensation polymer.

2. A condensation polymer according to claim 1, wherein X consists substantially of said aryldioxyl group.

3. A condensation polymer according to claim 1, wherein X is partially replaced with a $C_{6-13}$ hydrocarbylenedioxyl group of the formula:

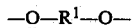

wherein $R^1$ is a phenylene or a 4,4′-isopropylidenephenylene.

4. A condensation polymer according to claim 1 or claim 2, wherein Ar is selected from the group consisting of 9,10-anthracenylene and a substituted 9,10-anthracenylene having 1 or 2 substituents selected from the group consisting of chlorine, bromine, methyl, ethyl, methoxy, ethoxy, diethylamino and dimethylamino.

5. A condensation polymer according to claim 4, wherein Ar is 9,10-anthracenylene.

6. A condensation polymer of claim 4 wherein the substituted 9,10-anthracenylene group is one selected from the group consisting of 2-chloro-9,10-anthracenylene, 2-methyl-9,10-anthracenylene, 2-chloro-6-methyl-9,10-anthracenylene, 2,7-dichloro-9,10-anthracenylene, 2,6-dimethyl-9,10-anthracenylene, 2-methyl-7-chloro-9,10-anthracenylene, 2-methoxy-9,10-anthracenylene, 2,6-dimethoxy-9,10-anthracenylene, 2-ethoxy-9,10-anthracenylene, and 2,6-di(N,N-diethylamino)-9,10-anthracenylene.

7. A condensation polymer according to claim 1 or claim 2, wherein Y is a $C_{4-8}$ hydrocarbylene group of the formula:

wherein $R^3$ is a $C_{4-8}$ alkylene group, a phenylene or a 4,4′-isopropylidenephenylene.

8. A condensation polymer according to claim 2, wherein Ar is 2,6-dimethoxy-9,10-anthracenylene group and Y is a $C_{6-16}$ dicarboxylic acid residue of the formula:

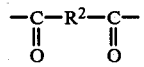

wherein $R^2$ is tetramethylene, pentamethylene, heptamethylene, octamethylene, decamethylene or dodecamethylene.

9. A condensation polymer according to claim 3, wherein Ar is 9,10-anthracenylene group, $R^1$ is 4,4′-isopropylidenephenylene and Y is sebacoyl.

10. A process for producing a condensation polymer of claim 1 wherein Y is (a) which comprises allowing an anthracenediol compound of the formula:

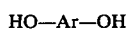

wherein Ar is an anthracene unit, together with, if desired, a diol compound of the formula:

HO—R¹—OH wherein $R^1$ is a phenylene or a 4,4′-isopropylidene phenyl, to react with a $C_{6-16}$ dicarboxylic acid dihalide.

11. A process according to claim 10, wherein the anthracene diol compound is prepared by reducing an anthraquinone compound or a substituted anthraquinone compound having 1 or 2 substituents selected from the group consisting of chlorine, bromine, ethyl, methyl, methoxy, ethoxy, diethylamino and dimethylamino.

12. A process according to claim 11, wherein the anthraquinone compound is anthraquinone.

13. A process according to claim 10, wherein a mixture of anthracene diol compound and at least one other diol compounds is employed.

14. A process according to claim 13, wherein other diol compounds are selected from the group consisting of hydroquinone and bisphenol A.

15. A process according to claim 10, wherein a dicarboxylic acid dihalide is used in an amount of 1 to 10 equivalents relative to the total diol compounds.

16. A process according to claim 10, wherein the reaction is carried out in the presence of an alkali.

17. A process according to claim 10, wherein the dicarboxylic acid dihalide is at least one dihalide of dicarboxylic acid selected from the group consisting of adipic acid, pimellic acid, succinic acid, azelaic acid, sebacic acid, 1,10-decanedicarboxylic acid, phthalic acid, isophthalic acid and terephthalic acid.

18. A process according to claim 17, wherein the dihalide is a dichloride.

19. A process for producing a condensation polymer of claim 1 wherein Y is (a) which comprises allowing an anthraquinone compound of the formula:

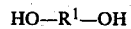

wherein Ar′ is an anthraquinone residue unit, to react with a $C_{6-16}$ dicarboxylic acid dihalide, under a reducing atmosphere in the presence of an excessive amount of a reducing agent.

20. A process according to claim 19, wherein the reducing agent is sodium sulfite, sodium hydrogen sulfite or sodium dithionite.

21. A process according to claim 19 or claim 20, wherein the amount of the reducing agent is 1 to 100 equivalents of a polynuclear aromatic quinone compound.

22. A process according to claim 19, wherein the polynuclear aromatic quinone compound is selected from the group consisting of anthraquinone, or a substituted anthraquinone having 1 or 2 substituents selected from the group consisting of chlorine, bromine, methyl, ethyl, methoxy, ethoxy, diethylamino and dimethylamino.

23. A process according to claim 22, wherein the anthraquinone is anthraquinone.

24. A process according to claim 19, wherein a dicarboxylic acid dihalide is used in an amount of 1 to 10 equivalents relative to the quinone compound.

25. A process according to claim 19, wherein an alkali is added in an amount of 2 to 100 equivalents relative to the quinone compound.

26. A process according to claim 19, wherein the dicarboxylic acid dihalide is at least one dihalide of dicarboxylic acid selected from the group consisting of adipic acid, pimellic acid, succinic acid, azelaic acid, sebacic acid, 1,10-decanedicarboxylic acid, phthalic acid, isophthalic acid and terephthalic acid.

27. A process according to claim 26, wherein the dihalide is a dichloride.

28. A process according to claim 19, wherein the reaction is carried out in the presence of 0.1 to 20 parts by weight of a surfactant per 100 parts of the anthraquinone.

29. A process for producing a condensation polymer of claim 1 wherein Y is (b) which comprises allowing a diol compound of the formula:

HO—Ar—OH wherein Ar is the anthracene unit, together with, if desired, a diol compound of the formula:

HO—R¹—OH wherein R¹ is a phenylene or 4,4'-isopropylidenephenylene, to react with a C₄₋₈ hydrocarbylene dihalide.

30. A process according to claim 29, wherein the anthracene diol compound is prepared by reducing an anthracene diol compound or a substituted anthracene diol compound having 1 or 2 substituents selected from the group consisting of chlorine, bromine, methyl, ethyl, methoxy, ethoxy, diethylamino and dimethylamino.

31. A process according to claim 30, wherein the anthraquinone compound is anthraquinone.

32. A process according to claim 29, wherein a mixture of an anthracene diol compound and at least one other diol compounds is employed.

33. A process according to claim 32, wherein other diol compounds are selected from the group consisting of hydroquinone and bisphenol A.

34. A process according to claim 29, wherein the reaction is carried out in the presence of an alkali.

35. A process according to claim 29, wherein the hydrocarbylene dihalide is at least one selected from the group consisting of dichlorohexane, dichlorooctane and dichloro-p-xylene.

36. A process for producing a condensation polymer of claim 1 wherein Y is (b) which comprises allowing a quinone compound of the formula:

O=Ar'=O wherein Ar' is an anthraquinone residue unit, to react with a C₄₋₈ hydrocarbylene dihalide, under a reducing atmosphere in the presence of an excessive amount of a reducing agent.

37. A process according to claim 36, wherein the reducing agent is sodium sulfite, sodium hydrogen sulfite or sodium dithionite.

38. A process according to claim 36, wherein the amount of the reducing agent is 1.2 to 5 equivalents of the amount necessary for reducing an anthraquinone.

39. A process according to claim 36, wherein the polynuclear aromatic quinone compound is anthraquinone, or a substituted anthraquinone having 1 or 2 substituents selected from the group consisting of chlorine, bromine, methyl, ethyl, methoxy, ethoxy, diethylamino and dimethylamino.

40. A process according to claim 39, wherein the anthraquinone compound is anthraquinone.

41. A process according to claim 36, wherein the hydrocarbylene dihalide is at least one selected from the group consisting of dichlorohexane, dichlorooctane and dichloro-p-xylene.

* * * * *